(12) United States Patent
Liang et al.

(10) Patent No.: US 12,301,124 B2
(45) Date of Patent: May 13, 2025

(54) AC-DC CONVERTER WITH ADAPTIVE REGULATION CIRCUIT

(71) Applicant: NANOWATT INC., Milpitas, CA (US)

(72) Inventors: Wenbo Liang, San Jose, CA (US); Edward Er Deng, Los Altos, CA (US); Ying Li, Shanghai (CN); San Hwa Chee, San Ramon, CA (US)

(73) Assignee: Nanowatt Inc., Milpitas, CA (US)

( * ) Notice: Subject to any disclaimer, the term of this patent is extended or adjusted under 35 U.S.C. 154(b) by 259 days.

(21) Appl. No.: 17/970,897

(22) Filed: Oct. 21, 2022

(65) Prior Publication Data
US 2024/0136938 A1 Apr. 25, 2024
US 2024/0235415 A9 Jul. 11, 2024

(51) Int. Cl.
*H02M 3/335* (2006.01)
*H02M 1/08* (2006.01)
*H02M 1/36* (2007.01)
*H02M 7/217* (2006.01)
*H02M 1/00* (2006.01)

(52) U.S. Cl.
CPC ......... *H02M 3/33592* (2013.01); *H02M 1/08* (2013.01); *H02M 1/36* (2013.01); *H02M 7/217* (2013.01); *H02M 1/0045* (2021.05)

(58) Field of Classification Search
CPC ........ H02M 1/0045; H02M 1/08; H02M 1/36; H02M 3/33592; H02M 7/217
See application file for complete search history.

(56) References Cited

U.S. PATENT DOCUMENTS 10,056,845 B1 * 8/2018 Chu .................. H02M 3/33592

* cited by examiner

*Primary Examiner* — Jue Zhang
(74) *Attorney, Agent, or Firm* — Sheppard Mullin Richter & Hampton LLP (57) ABSTRACT

An AC-DC converter includes an AC voltage source, a rectifier, and a rectifier control circuit. The rectifier includes a field effect transistor (FET) having a source, a drain, and a gate. The drain of the FET is coupled to the AC voltage source, and the source is coupled to ground. The rectifier control circuit is coupled to the gate of the FET. The rectifier control circuit is configured to provide a ramp voltage to regulate the FET after the AC voltage source is turned off.

18 Claims, 6 Drawing Sheets

AC-DC CONVERTER WITH ADAPTIVE REGULATION CIRCUIT

TECHNICAL FIELD

This disclosure is generally related to AC-DC converters, and more specifically to AC-DC converter's secondary side with synchronized rectifier having an adaptive regulation circuit to optimize the efficiency.

BACKGROUND

AC-DC converters are electrical circuits that can transform alternating current (AC) input into direct current (DC) output. AC-DC Converters function as rectifiers that convert an AC voltage to a DC voltage. They have been an indispensable component in many applications, such as industrial process control systems, consumer devices, measurement equipment, semiconductor manufacturing equipment, medical devices, and defense applications. AC-DC converters are commonly used in many devices that need to be powered.

In AC-DC converters, cross conduction between primary and secondary has to be avoided. By implementing FET regulation in the secondary, this condition can be avoided. However, this comes at an expense of efficiency due to increase in power losses.

SUMMARY

Described herein are AC-DC converter's secondary side with synchronized rectifier having an adaptive regulation circuit that provides improved efficiency while preventing cross conduction situation by minimizing the regulation period of the synchronized rectifier of an AC-DC converter.

In one aspect, an AC-DC converter is provided. The AC-DC converter's secondary side includes an AC voltage source, a rectifier, and a rectifier control circuit. The rectifier includes a field effect transistor (FET) having a source, a drain, and a gate. The source of the FET is connected to the ground, and the drain is connected to AC voltage source. The rectifier control circuit is coupled to the gate of the FET. The control circuit is configured to provide a ramp voltage to regulate the FET after the AC voltage source is turned off.

In some embodiments, the AC voltage source includes a transformer having a primary side and a secondary side, where the drain of the FET is coupled to the secondary side of the transformer.

In some embodiments, the rectifier control circuit starts to regulate the FET when the ramp voltage crosses a drain-source voltage of the FET at a time T1.

In some embodiments, the rectifier control circuit turns off the FET at a time T2 when the drain-source voltage of the FET reaches a first threshold, wherein the rectifier control circuit regulates the FET for a first time period between T2 and T1.

In some embodiments, the rectifier control circuit turns off the FET before the primary side of the transformer is turned on.

In some embodiments, the rectifier control circuit is configured to second regulate the FET after the primary side of the transformer is turned off subsequent to the primary side of the transformer being turned on.

In some embodiments, the rectifier control circuit is configured to second regulate the FET for a second time period, wherein the second time period is shorter than the first time period.

In some embodiments, the ramp voltage is a first ramp voltage. The rectifier control circuit is configured to provide the first ramp voltage having a first slope for the first regulating of the FET and a second ramp voltage having a second slope for the second regulating of the FET. The second slope is smaller than the first slope.

In some embodiments, the rectifier control circuit is configured to provide a second threshold. The rectifier control circuit regulates the FET in the first time period such that the drain-source voltage of the FET is held at the second threshold for at least a portion of the first time period. In some embodiments, the second threshold is less than the first threshold.

In another aspect, an AC-DC converter is provided. The AC-DC converter secondary side includes an AC voltage source, a rectifier, and a rectifier control circuit. The rectifier includes a field effect transistor (FET) having a source, a drain, and a gate. The drain of the FET is coupled to the AC voltage source, and the source is coupled to the ground. The rectifier control circuit is coupled to the gate of the FET. The rectifier control circuit is configured to adaptively regulate the FET for a plurality of cycles each time after the AC voltage source is turned off such that a time period to regulate the FET is shortened as the cycles progress.

In some embodiments, the AC voltage source includes a transformer having a primary side and a secondary side. The drain of the FET is coupled to the secondary side of the transformer.

In some embodiments, the rectifier control circuit is configured to provide a ramp voltage to regulate the FET. The rectifier control circuit starts to regulate the FET when the ramp voltage crosses a drain-source voltage of the FET at a time T1.

In some embodiments, the rectifier control circuit turns off the FET at a time T2 when a drain-source voltage of the FET reaches a first threshold.

In some embodiments, the rectifier control circuit turns off the FET before the primary side of the transformer is turned on.

In some embodiments, the ramp voltage is a first ramp voltage provided in a first cycle of the cycles. The rectifier control circuit is configured to provide the first ramp voltage having a first slope for first regulating of the FET and a second ramp voltage having a second slope for second regulating of the FET in a second cycle of the cycles subsequent to the first cycle. In some embodiments, the second slope is smaller than the first slope.

In some embodiments, the rectifier control circuit is configured to provide a second threshold. The rectifier control circuit regulates the FET for a time period from T1 to T2 such that the drain-source voltage of the FET is held at the second threshold for at least a portion of the time period.

In yet another aspect, an AC-DC converter is provided. The AC-DC converter includes an AC voltage source, a rectifier, and a rectifier control circuit. The rectifier includes a field effect transistor (FET) having a source, a drain, and a gate. The drain of the FET is coupled to the AC voltage source, and the source is coupled to the ground. The rectifier control circuit is coupled to the gate of the FET. The rectifier control circuit is configured to regulate the FET for a first time period in a first cycle, and regulate the FET for a second time period in a second cycle subsequent to the first cycle, where the second time period is shorter than the first time period.

In some embodiments, the AC voltage source includes a transformer having a primary side and a secondary side. The drain of the FET is coupled to the secondary side of the transformer.

In some embodiments, the rectifier control circuit is configured to provide a ramp voltage to regulate the FET. The rectifier control circuit starts to regulate the FET when the ramp voltage crosses a drain-source voltage of the FET.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION OF EMBODIMENTS

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to various AC-DC converters having an adaptative regulation circuit that provides reduced power losses and improved efficiency.

Figure 1:
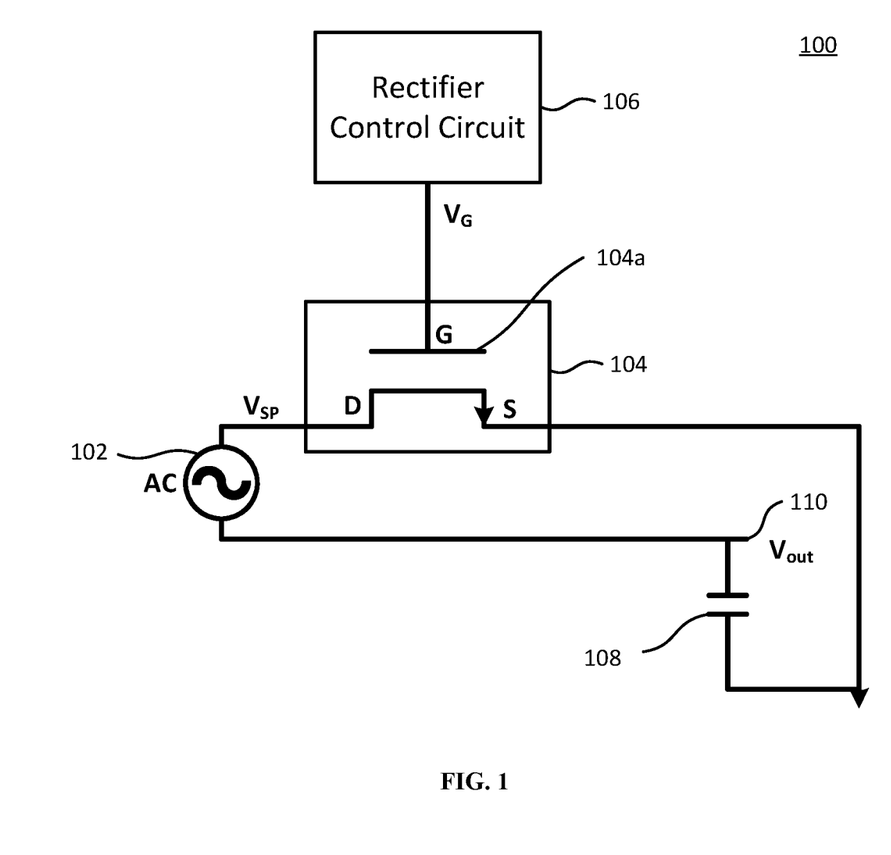
FIG. 1 is a circuit diagram depicting an AC-DC converter, according to one example embodiment.

Embodiments will now be explained with accompanying figures. Reference is first made to FIG. 1. FIG. 1 is a circuit diagram depicting an AC-DC converter 100, according to one example embodiment. The AC-DC converter 100 includes an AC voltage source 102, a rectifier 104, a rectifier control circuit 106, an output capacitor 108, and an output 110. In some embodiments, the rectifier 104 includes a field effect transistor (FET) 104a having a source (S), a drain (D), and a gate (G). The drain of FET 104a is coupled to the AC voltage source 102, the gate of the FET 104a is coupled to the rectifier control circuit 106, and the source of the FET 104a is coupled to the ground. The output 110 is coupled to the output capacitor 108.

Figure 2:
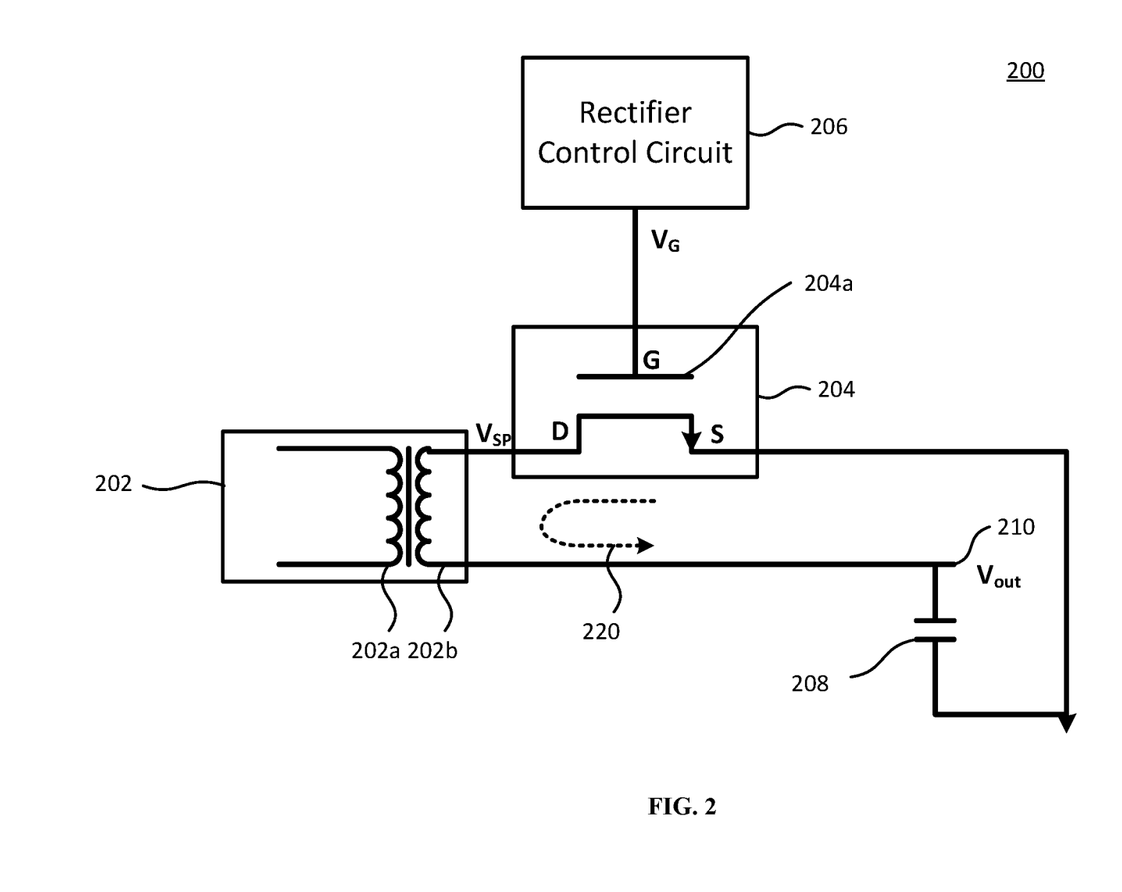
FIG. 2 is a circuit diagram depicting another AC-DC converter, according to one example embodiment.

FIG. 2 is a circuit diagram depicting another AC-DC converter 200, according to one example embodiment. The AC-DC converter 200 includes an AC voltage source 202, a rectifier 204, a rectifier control circuit 206, an output capacitor 208, and an output 210. The rectifier 204 includes an FET 204a. The AC-DC converter 200 is similar to the AC-DC converter 100 of FIG. 1 except that the AC voltage source 202 includes a transformer having a primary side 202a and a secondary side 202b. The drain of FET 204a is coupled to the secondary side 202b of the transformer. In some embodiments, the FET 104a and the FET 204a may be a metal-oxide-semiconductor FET (MOSFET). The output 210 is coupled to the secondary side 202b and the output capacitor 208.

Figure 3A:
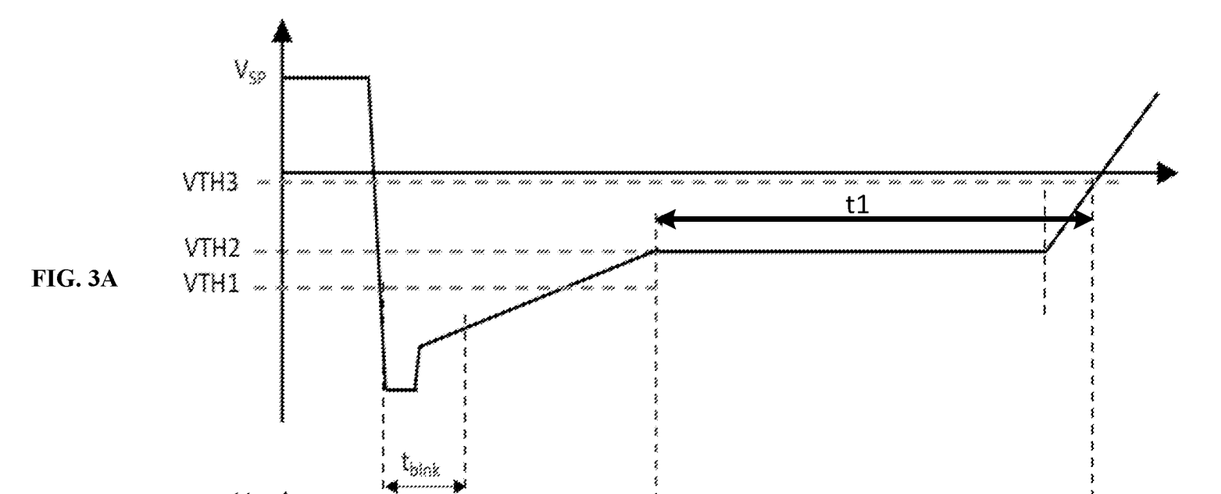
FIGS. 3A and 3B are diagrams illustrating waveforms indicating the sequence of control for the AC-DC converter depicted in FIG. 2, according to one example embodiment.
Figure 3B:
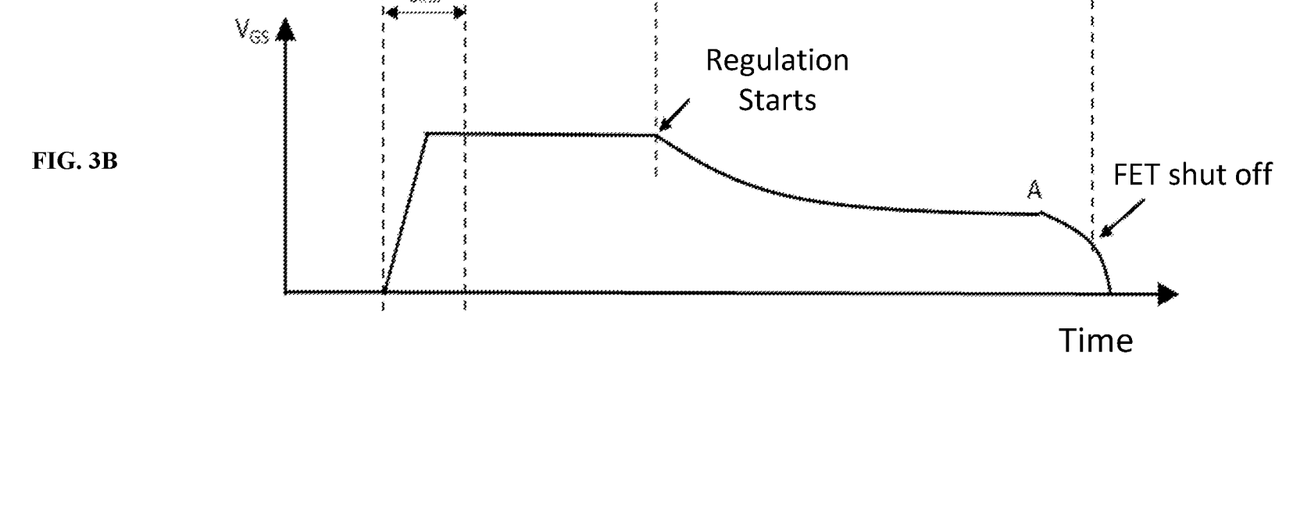

Reference is also made to FIGS. 3A and 3B. FIGS. 3A and 3B illustrate waveforms indicating the sequence of control for the AC-DC converter 200 of FIG. 2. The FET 204a in the AC-DC converter 200 is used to emulate an diode rectify electric current and is control by $V_G$. When the primary side 202a of the transformer is turned OFF, voltage $V_{SP}$ starts to fall, with a current flow depicted by the dotted line 220. Once the voltage $V_{SP}$ falls under a threshold VTH1 (FIG. 3A), the FET 204a is turned ON and will remain ON for a minimum of a time period $t_{blnk}$. As the voltage ($V_{DS}$) across the FET 204a continues to increase and reaches another threshold VTH2 due to the reduction in current flowing through the FET 204a, the gate voltage $V_G$ will start to decrease, and the voltage across the FET 204a is regulated to the threshold VTH2 by the rectifier control circuit 206 for a time period t1. During regulation, the voltage across the FET 204a is kept at the threshold VTH2. When $V_{DS}$ increases to VTH3, the gate of the FET 204a is pulled low to shut off the FET 204a (FIG. 3B).

In this control technique, the rectifier control circuit 206 is configured to regulate the voltage drop across the FET 204a to the threshold VTH2. This is beneficial when it is time to shut off the FET 204a, the $V_{GS}$ is low enough that it can be shut off quickly when the current cycle ends before the next cycle begins. Although this control technique is easy to implement, in some cases, when an FET having a low drain-source on resistance (Rdson) is selected for the AC-DC converter 200, the threshold VTH2 would be reached sooner and the regulation duration t1 (FIG. 3A) would be longer (as compared to an FET having a greater Rdson). A longer t1 would result in more power loss, reducing overall efficiency of the AC-DC converter 200.

Figure 4A:
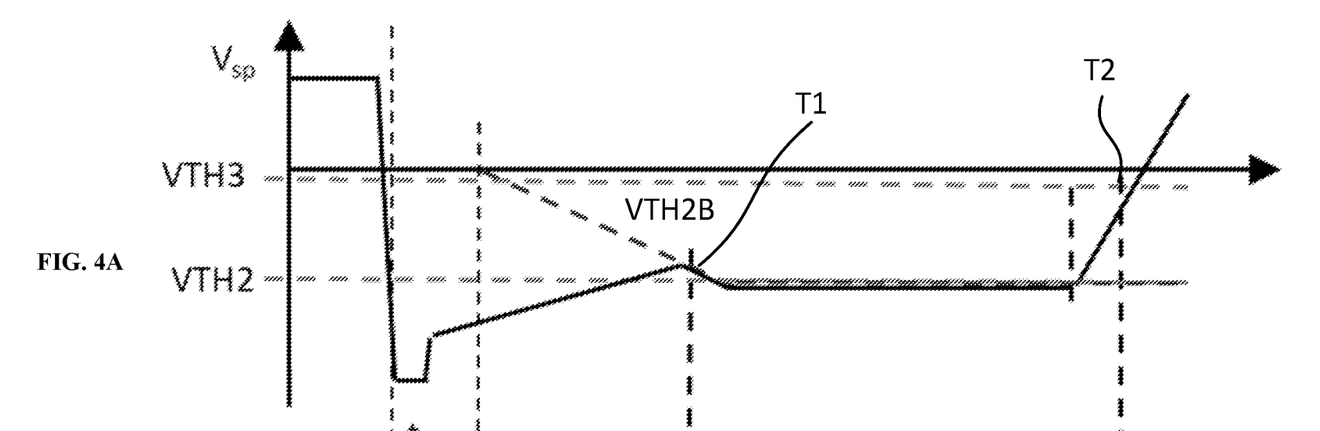
FIGS. 4A and 4B are diagrams illustrating waveforms indicating the sequence of control for the AC-DC converter depicted in FIG. 2, according to one example embodiment.
Figure 4B:
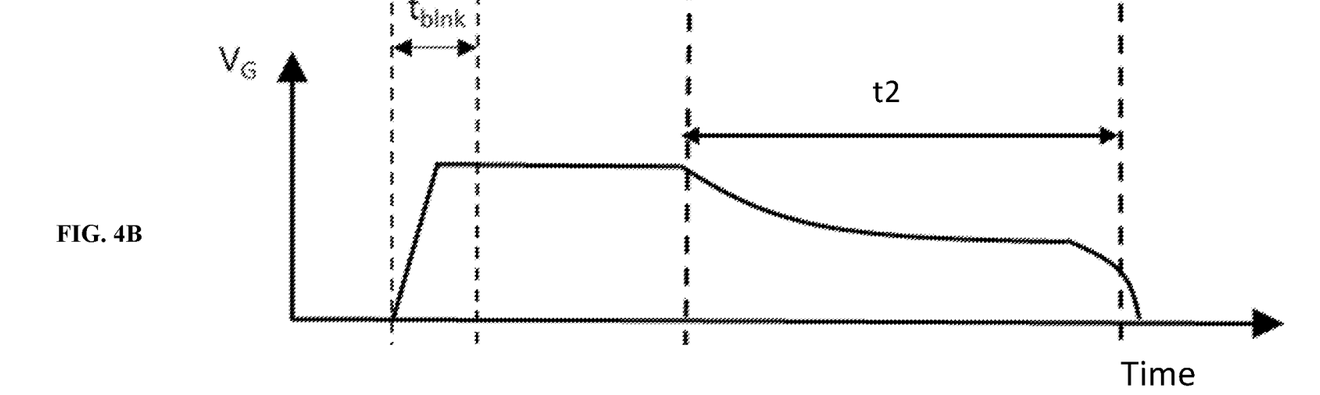

FIGS. 4A and 4B are diagrams illustrating waveforms indicating the sequence of control for the AC-DC converter 200, according to one example embodiment. When the primary side 202a of the transformer is turned OFF, voltage $V_{SP}$ 202a starts to fall. Once voltage $V_{SP}$ falls under a threshold, the FET 204a is turned ON and remains ON for a minimum of a time period $t_{blnk}$. After the time period $t_{blnk}$, the rectifier control circuit 206 is configured to provide a ramp voltage (VTH2B) (FIG. 4A) to regulate the FET 204a after the primary side 202a of the AC voltage source 202 is turned off. The rectifier control circuit 206 starts to regulate the FET 204a when the ramp voltage VTH2B crosses a drain-source voltage ($V_{DS}$) of the FET 204a at a time T1. That is, the regulation starts when the voltage drop across the FET 204a and the ramp voltage crosses. During the regulation, the voltage across the FET 204a is regulated to a threshold VTH2 by the rectifier control circuit 206.

When $V_{DS}$ increases to another threshold VTH3, the gate of the FET 204a is pulled low to shut off the FET 204a at time T2 such that the rectifier control circuit 206 regulates the FET for a time period t2 between T2 and T1. During the regulation, the voltage across the FET 204a is regulated to the threshold VTH2 for at least a portion of the entire regulation time period t2. These control sequences are completed before the primary side 202a of the transformer is turned on in the next/subsequent cycle.

Figure 5A:
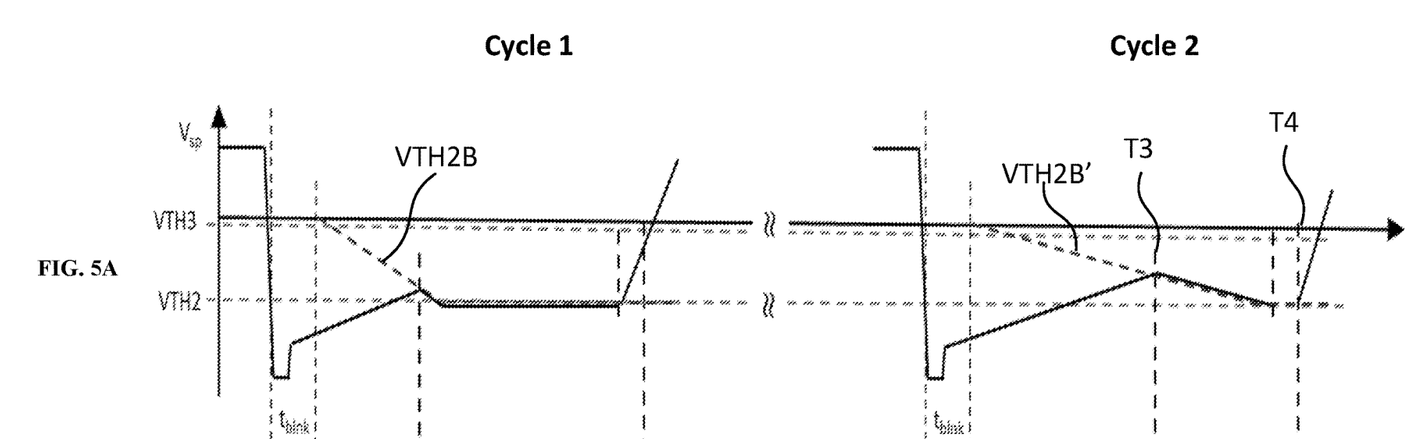
FIGS. 5A and 5B are diagrams illustrating waveforms indicating the sequence of control for the AC-DC converter depicted in FIG. 2, according to one example embodiment.
Figure 5B:
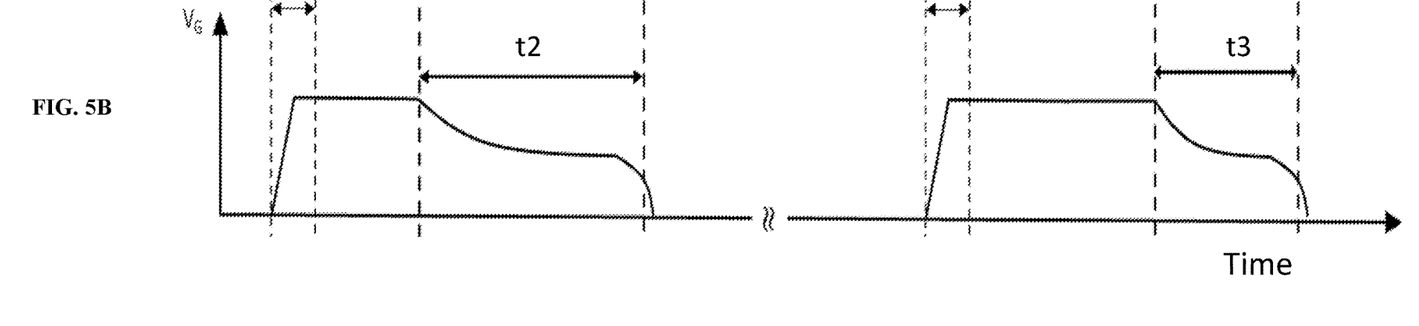

Reference is now made to FIGS. 2, 5A, and 5B. In the subsequent cycle (cycle 2), after the primary side 202a of the transformer is turned OFF for the second time, voltage $V_{SP}$ again starts to fall. Once voltage $V_{SP}$ falls under a threshold, the FET 204a is turned ON and remains ON for a minimum of a time period $t_{blnk}$. The rectifier control circuit 206 is configured to provide another ramp voltage (VTH2B') (FIG. 5A) to regulate the FET 204a after the AC voltage source 202 is turned off. The ramp voltage VTH2B' is generated after the $t_{blnk}$ time. The rectifier control circuit 206 starts to regulate the FET 204a when the ramp voltage VTH2B' crosses a drain-source voltage Vps of the FET 204a at a time T3. That is, the regulation starts when the voltage drop across the FET 204a and the ramp voltage VTH2B' crosses. For this cycle of regulation, the rectifier control circuit 206 is configured to generate the ramp voltage VTH2B' having a slope that is less than the slope of the ramp voltage VTH2B employed in the previous cycle (e.g., cycle 1). This can be achieved by a circuit that records the characteristics of the previous regulation and uses the characteristics to adaptively change the ramp voltage to shorten the regulation time.

During the regulation, the voltage across the FET 204a is regulated to the threshold VTH2 for at least a portion of the entire regulation time period t3 (FIG. 5B). When Vps increases to VTH3, the gate of the FET 204a is pulled low to shut off the FET 204a at time T4 such that the rectifier control circuit regulates the FET for a time period t3 between T4 and T3. These control sequences are completed before the primary side 202a of the transformer is turned on in the next/subsequent (e.g., third) cycle. As shown in FIG. 5B, the regulation time period t3 in cycle 2 is shorter than the regulation time period t2 in cycle 1. As more cycles of regulation are performed, the regulation time is gradually reduced to a constant. This process lowers power losses and improves efficiency of the AC-DC converter 200.

Figure 6:
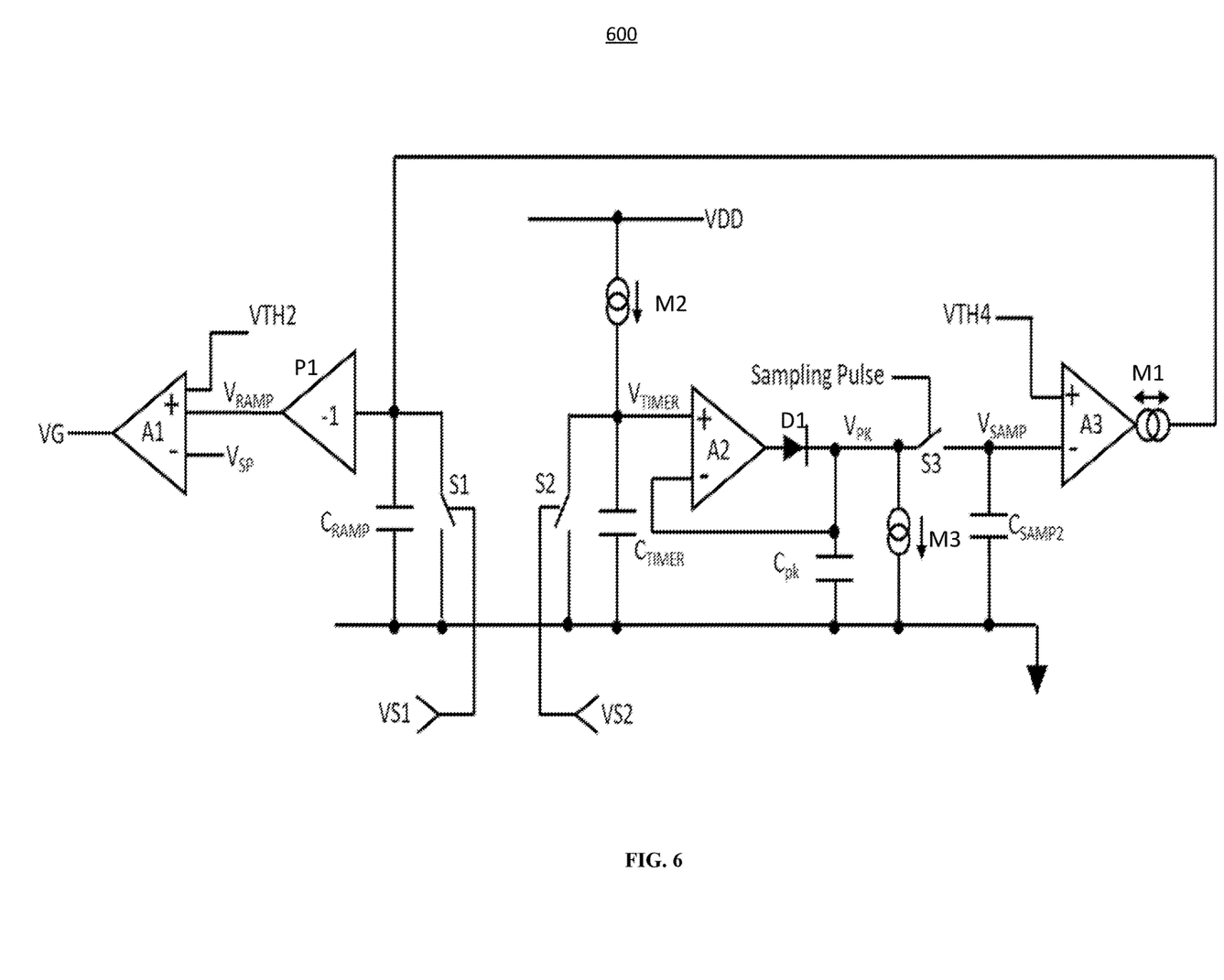
FIG. 6 is a diagram depicting a rectifier control circuit according to one example embodiment.

FIG. 6 is a diagram depicting a rectifier control circuit 600 according to one example embodiment. The rectifier control circuit 600 may be employed as the rectifier control circuit 206 of FIG. 2. After the blanking time, $t_{blnk}$ (FIGS. 4A, 5A), VS1 goes low to open the switch S1, allowing capacitor $C_{RAMP}$ to be charged up. The charging current is from a current source M1 determined by a transconductance amplifier A3. When a comparator (not shown in FIG. 6) detects the onset of regulation to a rectifier (e.g., rectifier 204 in FIG. 2), VS2 goes low to open the switch S2, which allows the capacitor $C_{TIMER}$ to be charged up by a current source M2 until $V_{SP}$ reaches VTH3 (e.g., FIGS. 4A and 5A) and then to be reset to zero. Through an operational amplifier A2 and a diode D1, the capacitor $C_{pk}$ is configured to hold the last voltage value of $V_{TIMER}$ (i.e., $V_{PK}$) before the capacitor $C_{TIMER}$ is reset. The last voltage value $V_{PK}$ is then sampled by capacitor $C_{SAMP2}$ by a Sampling Pulse that controls a switch S3 for sampling. When the switch S3 is opened, the capacitor $C_{pk}$ is discharged by a current source M3. The sampled voltage value $V_{SAMP}$ is then compared with a threshold VTH4 at the transconductance amplifier A3, and a difference between the sampled voltage value $V_{SAMP}$ and the threshold VTH4 is used to generate a current to charge up $C_{RAMP}$ in the next cycle such that eventually $V_{SAMP}$ would be the same as VTH4. In the rectifier control circuit 600, VTH4 along with the charging rate of $C_{TIMER}$ determines the regulation time of the rectifier (e.g., rectifier 204) of an AC-DC converter (e.g., converter 200).

The current source M1 charges the capacitor $C_{RAMP}$ based on the output of the transconductance amplifier A3. The signal from the charged capacitor $C_{RAMP}$ is rectified by a rectifier P1 to provide $V_{RAMP}$ to an operational amplifier A1. The operational amplifier A1 is further provided with $V_{SP}$ and VTH2 to generate $V_G$ to control the FET (e.g., the FET 204a of FIG. 2) of the AC-DC converter (e.g., the converter 200) as depicted in FIGS. 4A, 4B, 5A, and 5B.

In some embodiments, after the regulation is initiated, a timer is started and then ended once the $V_{sp}$ crosses a threshold, for example, VTH3 (FIG. 4A). The difference between the sampled voltage value $V_{SAMP}$ and the threshold VTH4 is used to modify the ramp slope of VTH2B (FIG. 4A). If the difference is positive, the ramp slope is reduced or vice versa in the next cycle. Eventually, as the modification is applied in more cycles, the final regulation time is determine by the timer period either set internally in the rectifier control circuit or externally by a user.

Referring back to FIG. 2, in some embodiments, the rectifier control circuit 206 is configured to adaptively regulate the FET 204a for a plurality of cycles each time after the AC voltage source 202 is turned off such that a time period to regulate the FET 204a is shortened as the cycles progress. This is achieved by the rectifier control circuit 206 generating ramp voltages with reduced slopes to shorten the regulation time in each cycle.

In summary, the disclosed rectifier control circuits are configured to regulate the regulation time for the FET of the AC-DC converter while the conventional AC-DC converter relies on regulating the voltage across the FET of the AC-DC converter. The techniques disclosed herein can gradually shorten the regulation time as the regulation cycles progress to reduce power loss of the converter system.

In another aspect, the disclosed techniques regulate an FET of an AC-DC converter independent of the FET's Rdson resistance.

In another aspect, the disclosed techniques provide an AC-DC converter. The AC-DC converter includes an AC voltage source, a rectifier, and a rectifier control circuit. The rectifier includes an FET having a source, a drain, and a gate. The drain of the FET is coupled to the AC voltage source, and the source is coupled to the ground. The rectifier control circuit is coupled to the gate of the FET. The rectifier control circuit is configured to provide a ramp voltage to regulate the FET after the AC voltage source is turned off.

In yet another aspect, the disclosed techniques provide another AC-DC converter. The AC-DC converter includes an AC voltage source, a rectifier, and a rectifier control circuit. The rectifier includes an FET having a source, a drain, and a gate. The drain of the FET is coupled to the AC voltage source, and the source is coupled to the ground. The rectifier control circuit is coupled to the gate of the FET. The rectifier control circuit is configured to adaptively regulate the FET for a plurality of cycles each time after the AC voltage source is turned off such that a time period to regulate the FET is shortened as the cycles progress.

In yet another aspect, the disclosed techniques provide another AC-DC converter. The AC-DC converter includes an AC voltage source, a rectifier, and a rectifier control circuit. The rectifier includes a field effect transistor (FET) having a source, a drain, and a gate. The drain of the FET is coupled to the AC voltage source, and the source is coupled to the ground. The rectifier control circuit is coupled to the gate of the FET. The rectifier control circuit is configured to regulate the FET for a first time period in a first cycle, and regulate the FET for a second time period in a second cycle subsequent to the first cycle, where the second time period is shorter than the first time period.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. An AC-DC converter comprising:
   an AC voltage source;
   a rectifier comprising a field effect transistor (FET) having a source, a drain, and a gate, wherein the drain of the FET is coupled to the AC voltage source, and the source is coupled to ground; and
   a rectifier control circuit coupled to the gate of the FET, wherein the rectifier control circuit is configured to provide a ramp voltage to first regulate the FET after the AC voltage source is turned off;
   wherein the AC voltage source comprises a transformer having a primary side and a secondary side, wherein the drain of the FET is coupled to the secondary side of the transformer; and
   wherein the rectifier control circuit starts to regulate the FET when the ramp voltage crosses a drain-source voltage of the FET at a time T1.

2. The AC-DC converter of claim 1, wherein the rectifier control circuit turns off the FET at a time T2 when the drain-source voltage of the FET reaches a first threshold, wherein the rectifier control circuit regulates the FET for a first time period between T2 and T1.

3. The AC-DC converter of claim 2, wherein the rectifier control circuit turns off the FET before the primary side of the transformer is turned on.

4. The AC-DC converter of claim 3, wherein the rectifier control circuit is configured to second regulate the FET after the primary side of the transformer is turned off subsequent to the primary side of the transformer being turned on.

5. The AC-DC converter of claim 4, wherein the rectifier control circuit is configured to second regulate the FET for a second time period, wherein the second time period is shorter than the first time period.

6. The AC-DC converter of claim 5, wherein the ramp voltage is a first ramp voltage, wherein the rectifier control circuit is configured to provide the first ramp voltage having a first slope for the first regulating of the FET and a second ramp voltage having a second slope for the second regulating of the FET, wherein the second slope is smaller than the first slope.

7. The AC-DC converter of claim 2, wherein the rectifier control circuit is configured to provide a second threshold, wherein the rectifier control circuit regulates the FET in the first time period such that the drain-source voltage of the FET is held at the second threshold for at least a portion of the first time period.

8. The AC-DC converter of claim 7, wherein the second threshold is less than the first threshold.

9. An AC-DC converter comprising:
   an AC voltage source;
   a rectifier comprising a field effect transistor (FET) having a source, a drain, and a gate, wherein the drain of the FET is coupled to the AC voltage source, and the source is coupled to ground; and
   a rectifier control circuit coupled to the gate of the FET,
   wherein the rectifier control circuit is configured to adaptively regulate the FET for a plurality of cycles each time after the AC voltage source is turned off such that a time period to regulate the FET is shortened as the cycles progress.

10. The AC-DC converter of claim 9, wherein the AC voltage source comprises a transformer having a primary side and a secondary side, wherein the drain of the FET is coupled to the secondary side of the transformer.

11. The AC-DC converter of claim 10, wherein:
    the rectifier control circuit is configured to provide a ramp voltage to regulate the FET; and
    the rectifier control circuit starts to regulate the FET when the ramp voltage crosses a drain-source voltage of the FET at a time T1.

12. The AC-DC converter of claim 11, wherein the rectifier control circuit turns off the FET at a time T2 when the drain-source voltage of the FET reaches a first threshold.

13. The AC-DC converter of claim 12, wherein the rectifier control circuit turns off the FET before the primary side of the transformer is turned on.

14. The AC-DC converter of claim 12, wherein the rectifier control circuit is configured to provide a second threshold, wherein the rectifier control circuit regulates the FET for a time period from T1 to T2 such that the drain-source voltage of the FET is held at the second threshold for at least a portion of the time period.

15. The AC-DC converter of claim 11, wherein the ramp voltage is a first ramp voltage provided in a first cycle of the cycles, wherein the rectifier control circuit is configured to provide the first ramp voltage having a first slope for first regulating of the FET and a second ramp voltage having a second slope for second regulating of the FET in a second cycle of the cycles subsequent to the first cycle, wherein the second slope is smaller than the first slope.

16. An AC-DC converter comprising:
an AC voltage source;
a rectifier comprising a field effect transistor (FET) having a source, a drain, and a gate, wherein the drain of the FET is coupled to the AC voltage source, and the source is coupled to ground; and
a rectifier control circuit coupled to the gate of the FET, wherein the rectifier control circuit is configured to regulate the FET for a first time period in a first cycle, and regulate the FET for a second time period in a second cycle subsequent to the first cycle, wherein the second time period is shorter than the first time period.

17. The AC-DC converter of claim 16, wherein the AC voltage source comprises a transformer having a primary side and a secondary side, wherein the drain of the FET is coupled to the secondary side of the transformer.

18. The AC-DC converter of claim 16, wherein:
the rectifier control circuit is configured to provide a ramp voltage to regulate the FET; and
the rectifier control circuit starts to regulate the FET when the ramp voltage crosses a drain-source voltage of the FET.

* * * * *